United States Patent [19]

Wagner, III et al.

[11] 4,311,609
[45] * Jan. 19, 1982

[54] METHOD OF PRODUCING INORGANIC WATER-SOFTENING BEADS

[75] Inventors: Joseph E. Wagner, III, Newark, Del.; Lloyd E. Williams, Bel Air, Md.

[73] Assignee: J. M. Huber Corporation, Locust, N.J.

[*] Notice: The portion of the term of this patent subsequent to Oct. 28, 1997, has been disclaimed.

[21] Appl. No.: 172,336

[22] Filed: Jul. 25, 1980

Related U.S. Application Data

[63] Continuation-in-part of Ser. No. 26,390, Apr. 2, 1979, Pat. No. 4,230,593, which is a continuation-in-part of Ser. No. 883,007, Mar. 3, 1978, abandoned.

[51] Int. Cl.$^3$ .................. B01J 39/14; C01B 33/28; C02F 1/42; C11D 3/12
[52] U.S. Cl. ................... 252/179; 210/502; 210/51 D; 210/687; 252/174; 252/174.23; 252/174.25; 252/448; 252/445 Z; 264/25; 264/109; 264/117; 264/122; 264/125; 264/126; 428/402
[58] Field of Search ............ 210/502, 51 D; 252/174, 252/174.23, 174.25, 179, 448, 455 Z; 428/402; 264/25, 109, 117, 122, 125, 120

[56] References Cited

U.S. PATENT DOCUMENTS

| | | | |
|---|---|---|---|
| 2,460,516 | 2/1949 | Luaces | 428/407 X |
| 3,048,537 | 8/1962 | Pall | 210/510 |
| 3,181,231 | 5/1965 | Breck | 252/179 X |
| 3,375,933 | 4/1968 | Rodman | 210/510 X |
| 3,538,020 | 11/1970 | Heskett | 210/496 |
| 3,651,948 | 3/1972 | Bunn | 210/502 |
| 4,061,807 | 12/1977 | Shaler | 210/510 X |
| 4,066,394 | 1/1978 | Leonard | 8/137 |
| 4,071,377 | 1/1978 | Schwuger | 134/29 |
| 4,096,081 | 6/1978 | Phenicie | 252/179 |
| 4,120,653 | 10/1978 | Smolka | 8/137 |

FOREIGN PATENT DOCUMENTS

| | | | |
|---|---|---|---|
| 2055423 | 5/1972 | United Kingdom | 252/179 |
| 1390668 | 4/1975 | United Kingdom | 428/402 |

*Primary Examiner*—Dennis L. Albrecht
*Attorney, Agent, or Firm*—Ernest A. Schaal; Harold H. Flanders

[57] ABSTRACT

A non-water dispersible water-softening bead is disclosed having from 80 to 90% sodium alumino silicate and from 10 to 20% low density polyethylene. The bead has a diameter of between 200 and 1000 microns and a calcium capacity of at least 200 mg calcium carbonate/g. The sodium alumino silicate has a silica to aluminum oxide molar ratio of between 2:1 and 4:1 and a sodium oxide to aluminum oxide molar ratio of between 0.8:1 and 1.2:1.

3 Claims, No Drawings

METHOD OF PRODUCING INORGANIC WATER-SOFTENING BEADS

CROSS-REFERENCE TO RELATED APPLICATION

This application is a continuation-in-part of co-pending U.S. application Ser. No. 26,390 filed on Apr. 2, 1979, now U.S. Pat. No. 4,230,593, which is a continuation-in-part of co-pending U.S. application Ser. No. 883,007 filed on Mar. 3, 1978 now abandoned.

BACKGROUND OF THE INVENTION

1. Field of the Invention

In general, the present invention relates to water softeners and more especially to non-water dispersible sodium alumino silicate water softeners.

2. Description of Prior Art

Hard water is water that contains a high degree of calcium and magnesium ions. This hard water causes scale in power plant boilers, water pipes and domestic cooking utensils. It also causes soap precipitation producing undesirable curd and wasted soap. Water softening involves the exchange of one divalent hard ion (either calcium or magnesium) for two monovalent soft ions (such as sodium) on a resin. Typically, hard water is passed through a bed of sodium cation exchange resin and then is softened by the formula:

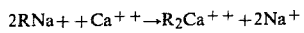

Regeneration of the exchanger usually involves passing a fairly concentrated solution of sodium chloride through the resin causing the reverse reaction of:

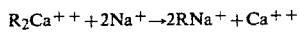

Typically, a gallon of hard water contains greater than 5 grains of calcium carbonate (1 grain per gallon equals 0.017 grams per liter).

Ionic exchange has been used on an industrial basis since around 1910 with the introduction of water softening, using natural and later synthetic silicates. The introduction of synthetic organic ion exchange resins since 1935 resulted from the synthesis of a phenolic concentration product containing sulfonate or amine groups, which could be used for the reversible exchange of cations and anions. The period since 1940 has been marked by a rapidly increased degree of sophistication in the design of ion exchange materials with the porosity and particle size being controlled by conditions of polymerization. Physical and chemical stability have been modified and improved to the extent that the inorganic exchangers (mineral, green sand and zeolites) have been almost completely displaced by the resinous types. Unfortunately, the resin cation ionic exchangers, being organic, cause a greater ecological problem than the inorganic zeolites. Also, their cost is higher.

U.S. Pat. No. 3,985,669 shows a composition comprising a water-insoluble aluminosilicate ion exchange material, an organic surface-active agent, a minor amount of an alkali metal oxide silicate solid and sodium sulfate. Unlike the present invention, this patent teaches using the surface-active agent in forming the spray-dried granule.

U.S. Pat. No. 4,000,094 shows a composition containing a water-insoluble aluminosilicate, an organic detergent, process aids, and sodium sulfate. The processing aids are a mixture of a sodium carbonate and a water-soluble salt of an organic compound having from 1 to 6 carbon atoms.

U.S. Pat. No. 4,019,999 shows a composition containing an alkali metal silicate, an aluminosilicate, and alkali metal orthophosphate or pyrophosphate and sodium sulfate.

SUMMARY OF THE INVENTION

Accordingly, it is an object of this invention to produce a new and highly effective water softener which overcomes the deficiencies of the prior art as described above.

It is a further object of this invention to produce a more economical and more environmentally sound water softener.

Other objects and a fuller understanding of the invention may be had by referring to the following description and claims.

The present invention overcomes the deficiencies of the prior art and achieves its objectives by forming a water-softening bead comprising from 80 to 90% by weight sodium alumino silicate and from 10 to 20% by weight low density polyethylene. These beads are between 200 and 1000 microns in size. They have a calcium capacity of at least 200 mg calcium carbonate/g. The sodium alumino silicate may be either amorphous or crystalline. The silica to aluminum oxide molar ratio is between 2:1 and 4:1, and the sodium oxide to aluminum oxide molar ratio is between 0.8:1 and 1.2:1.

The water-softening beads are formed by adding the sodium alumino silicate and low density polyethylene to a pelletizer selected from the group consisting of disc pelletizers, pinmixers and drum pelletizers. The silicate and polyethylene are heated in the pelletizer, preferably by infra red heat, to the softening point of the polyethylene while the beads form. The beads are then cooled to below the softening point of the polyethylene. Then the beads are removed from the pelletizer and screened to obtain the desired particle size.

By varying the content of the ingredients, the bead can be produced to meet a desired bulk density, non-water dispersibility and hardness. If a crystalline sodium alumino silicate with a silica to aluminum oxide ratio of 2:1 is used, then this sodium alumino silicate must be blended with a crystalline sodium alumino silicate with a higher silica to aluminum oxide ratio or an amorphous sodium alumino silicate in order to have improved magnesium exchange.

DESCRIPTION OF THE PREFERRED EMBODIMENTS

In its broadest aspect, the present invention is based on the discovery that a non-water dispersible inorganic water-softening bead can be produced containing 80 to 90% by weight of sodium alumino silicate and from 10 to 20% by weight of low density polyethylene by adding the sodium alumino silicate and polyethylene to a pelletizer where the silicate and polyethylene are heated to the softening point of the polyethylene while the beads are formed. The beads are then cooled to below the softening point of the polyethylene and are removed from the pelletizer and screened to obtain beads having a uniform size between 200 and 1000 microns in diameter and a calcium capacity of at least 200 mg calcium carbonate/g. Beads having a size greater than 1000 microns have a lower calcium exchange capacity. By varying the contents of the ingredients, the bead can be produced to meet a desired bulk density, dispersibility and hardness.

Preferably the polyethylene is a homopolymer having a softening point of from 80 to 120 degrees Celsius, a hardness of from 0.5 to 8.0 dmm, and a density less than 1.0 g/cc. One useful polyethylene is A-C Polyethylene 617A (a product of Allied Chemicals) which has a softening point of 102 degrees Celsius, a hardness of 7.5 dmm and a density of 0.91 g/cc.

The sodium alumino silicate, which may be either crystalline or amorphous, has a silica to aluminum oxide ratio of between 2:1 and 4:1 and a sodium oxide to aluminum oxide ratio of between 0.8:1 and 1.2:1. Preferably, the sodium alumino silicate has a silica to aluminum oxide ratio between 2:1 and 3:1.

The silica to aluminum oxide ratio between 2:1 and 3:1 is preferred because the higher the silica to aluminum oxide ratio the less calcium ion exchange capacity one has in the solution. If crystalline sodium alumino silicate is used having a silica to aluminum oxide ratio of 2:1 then an additional sodium alumino silicate of higher silica to aluminum oxide ratio needs to be blended into the mixer in order to give magnesium ion exchange. Crystalline sodium alumino silicate with a silica to aluminum oxide ratio of 2:1 has poor magnesium ion exchange capacity.

The water-softening beads are formed by adding the sodium alumino silicate and low density polyethylene to a pelletizer, preferably a disc pelletizer. Other pelletizers that would work are pinmixers and drum pelletizers. In the pelletizer the silicate and polyethylene are heated, preferably by infra red heat, to the softening point of the polyethylene while the beads are formed. The beads are then cooled to below the softening point of the polyethylene. Then the beads are removed from the pelletizer and screened to obtain the desired particle size.

In a preferred embodiment of the present invention, from 80 to 90% by weight of sodium alumino silicate having a silica to aluminum oxide ratio between 2:1 and 3:1 from 10 to 20% low density polyethylene to a disc pelletizer. In the pelletizer the silicate and low density polyethylene are heated by infra red heat to the softening point of the low density polyethylene while the beads are formed. The beads are then cooled to below the softening point of the low density polyethylene. Then the beads are removed from the pelletizer and screened to obtain the desired particle size.

The invention will be further illustrated by the following examples which set forth particularly advantageous method and composition embodiments. While the examples are provided to illustrate the present invention, they are not intended to limit it.

PREPARATION OF SODIUM ALUMINO SILICATE

Example A

An aqueous solution of sodium silicate having a silica to sodium oxide mole ratio of 2.5 was subjected to vigorous agitation and contacted with an aqueous solution of sodium aluminate to form a reaction mass. A finely divided pigmentary amorphous sodium alumino silicate intermediate was precipitated as the reaction mass was maintained in the range of 21 and 82 degrees Celsius and the pH of the reaction mass was maintained at a level of at least 10.0. The precipitated intermediate was crystallized and the reaction mass comprising the crystalline product was quenched to prevent further crystallization and to provide a material having a predetermined crystalline structure. The solid crystalline sodium alumino silicate was recovered from the aqueous mass and the aqueous mass was recycled to provide a source of sodium aluminate. This process is described in U.S. Pat. No. 4,041,135 which is incorporated herein by reference.

Example B

An aqueous solution of sodium silicate having a silica to sodium oxide mole ratio of 2.6 is subjected to rigorous agitation and contacted with a dilute solution of sodium aluminate having a sodium oxide to aluminum oxide mole ratio of 2.0 to form a reaction mass. The reaction mass is agitated and the pH is maintained at a level of at least 10.5 to precipitate a finely divided amorphous sodium alumino silicate having an ion exchange capacity equal to crystalline zeolites and having an oil absorption of at least 75 cc/100 g; a BET surface area of at least 20 sq. m/g; a pack density greater than 10 pounds per cubic foot; a mercury intrusion void greater than 2.0 cc/g; a base exchange capacity of at least 200 mg calcium carbonate/g; and an initial water softening rate of 2.7 grains per gallon per minute. This process is described in U.S. patent application No. 621,31 by Lloyd E. Williams and Robert K. Mays and assigned to the J. M. Huber Corp. which is incorporated herein by reference.

Example C

A precipitated white powdery pigment is made consisting essentially of oxides of sodium, aluminum and silicon substantially all the particles of which are less than 0.5 microns in diameter, wherein the molar ratio of silica to sodium oxide is 4:1 and the molar ratio of sodium oxide to aluminum oxide is 1:1, the composition having a specific gravity of 2.10. This product is described in U.S. Pat. No. 2,739,073 which is incorporated herein by reference.

Example D

A sodium-aluminum-silicate water mixture is prepared whose composition falls within the range; silica to aluminum oxide molar ratio from 3.0 to 5.0; sodium oxide to silica molar ratio from 1.2 to 1.5; and water to sodium oxide molar ratio from 35 to 60. This mixture is maintained at a temperature within the range from about 20 to 120 degrees Celsius until crystals are formed. These crystals are then separated from the mother liquor. This process is described in U.S. Pat. No. 2,882,244 which is incorporated herein by reference.

PREPARATION OF WATER-SOFTENING BEAD

Example I 10 parts of A-C Polyethylene 617A and 90 parts of the sodium alumino silicate of Example A are added to a disc pelletizer to a temperature of 102 degrees Celsius (the softening point of the polyethylene) for thirty minutes while beads were formed. Then the heaters were turned off and the beads were allowed to cool to 85 degrees Celsius, then the beads were removed from the pelletizer and screened to obtain a particle size of between 200 and 1000 microns in diameter. This product had a calcium exchange capacity of 240 mg calcium carbonate/g.

Example II 20 parts of A-C Polyethylene 617A and 80 parts of the sodium alumino silicate of Example A are added to a disc pelletizer. In the pelletizer, the polyethylene and silicate were heated by infra red heaters to a temperature of 102 degrees Celsius (the softening point of the polyethylene) for thirty minutes while beads were formed. Then the heaters were turned off and the beads were allowed to cool to 85 degrees Celsius, then the beads were removed from the pelletizer and screened to obtain a particle size of between 200 and 1000 microns in diameter. This product had a calcium exchange capacity of 249 mg calcium carbonate/g.

Example III

From 10 to 20 parts of A-C Polyethylene 617A and from 80 to 90 parts of the sodium alumino silicate of Example B are added to a disc pelletizer. In the pelletizer, the polyethylene and silicate are heated by infra red heaters to a temperature of 102 degrees Celsius (the softening point of the polyethylene) for thirty minutes while beads are formed. Then the heaters are turned off and the beads are allowed to cool to 85 degrees Celsius, then the beads are removed from the pelletizer and screened to obtain a particle size of between 200 and 1000 microns in diameter. This product is expected to have a calcium exchange capacity of at least 200 mg calcium carbonate/g.

Example IV

From 10 to 20 parts of A-C Polyethylene 617A and from 80 to 90 parts of the sodium alumino silicate of Example C are added to a disc pelletizer. In the pelletizer, the polyethylene and silicate are heated by infra red heaters to a temperature of 102 degrees Celsius (the softening point of the polyethylene) for thirty minutes while beads are formed. Then the heaters are turned off and the beads are allowed to cool to 85 degrees Celsius, then the beads are removed from the pelletizer and screened to obtain a particle size of between 200 and 1000 microns in diameter. This product is expected to have a calcium exchange capacity of at least 200 mg calcium carbonate/g.

Example V

From 10 to 20 parts of A-C Polyethylene 617A and from 80 to 90 parts of the sodium alumino silicate of Example D are added to a disc pelletizer. In the pelletizer, the polyethylene and silicate are heated by infra red heaters to a temperature of 102 degrees Celsius (the softening point of the polyethylene) for thirty minutes while beads are formed. Then the heaters are turned off and the beads are allowed to cool to 85 degrees Celsius, then the beads are removed from the pelletizer and screened to obtain a particle size of between 200 and 1000 microns in diameter. This product is expected to have a calcium exchange capacity of at least 200 mg calcium carbonate/g.

Thus, in operation, non-water dispersible inorganic water-softening beads are formed by adding sodium alumino silicate and low density polyethylene to a pelletizer where the silicate and polyethylene are heated to the softening point of the polyethylene while the beads are formed. The beads are then cooled to below the softening point of the low density polyethylene, then they are removed from the pelletizer and screened to obtain the desired particle size and calcium carbonate exchange capacity. By varying the content of the ingredients, the bead can be produced to meet a desired bulk density, non-dispersibility and hardness.

While the present invention has been described with reference to specific embodiments, this application is intended to cover those various changes and substitutions which may be made by those skilled in the art without departing from the spirit and scope of the appended claims.

I claim:

1. A method of producing non-water dispersible water-softening beads comprising the steps of:
    (a) adding from 80 to 90 parts of a sodium alumino silicate having a silica to aluminum oxide molar ratio of between 2:1 and 4:1 and a sodium oxide to aluminum oxide molar ratio of between 0.8:1 and 1.2:1 and from 10 to 20 parts of low density polyethylene to a pelletizer selected from the group consisting of disc pelletizers, pinmixers and drum pelletizers.
    (b) heating the silicate and polyethylene to the softening point of the polyethylene while forming beads in the pelletizer;
    (c) cooling the beads to below the softening point of the polyethylene;
    (d) removing the cooled beads from the pelletizer; and
    (e) screening the beads to obtain beads having a diameter of between 200 and 1000 microns and a calcium capacity of at least 200 mg calcium carbonate/g.

2. A method of producing non-water dispersible water-softening beads according to claim 1 wherein said polyethylene has a softening of about 102 degrees Celsius, a hardness of about 7.5 dmm and a density of about 0.91 g/cc.

3. A method of producing non-water dispersible water-softening beads according to claim 2 wherein said silicate and polyethylene are heated by infra red heat.

* * * * *

UNITED STATES PATENT AND TRADEMARK OFFICE
CERTIFICATE OF CORRECTION

PATENT NO. : 4,311,609

DATED : January 19, 1982

INVENTOR(S) : Joseph E. Wagner III and Lloyd E. Williams

It is certified that error appears in the above—identified patent and that said Letters Patent is hereby corrected as shown below:

Column 4, line 26, "621,31" should be -- 621,314 --.

*Signed and Sealed this*

*Fourteenth* Day of *September 1982*

[SEAL]

Attest:

GERALD J. MOSSINGHOFF

*Attesting Officer*     *Commissioner of Patents and Trademarks*